United States Patent
Sakawa et al.

(10) Patent No.: US 7,394,789 B2
(45) Date of Patent: Jul. 1, 2008

(54) HANDOFF CONTROL METHOD, BASE STATION CONTROLLER, AND BASE TRANSCEIVER SUBSYSTEM

(75) Inventors: Kozo Sakawa, Yokohama (JP); Masayoshi Tateno, Tokyo (JP); Isao Higuma, Yokohama (JP)

(73) Assignee: Hitachi Communication Technologies, Inc., Tokyo (JP)

( * ) Notice: Subject to any disclaimer, the term of this patent is extended or adjusted under 35 U.S.C. 154(b) by 432 days.

(21) Appl. No.: 11/040,870

(22) Filed: Jan. 20, 2005

(65) Prior Publication Data
US 2006/0029021 A1 Feb. 9, 2006

(30) Foreign Application Priority Data
Aug. 5, 2004 (JP) ............................. 2004-228863

(51) Int. Cl.
*H04Q 7/00* (2006.01)
(52) U.S. Cl. ................... 370/331; 455/436; 455/437; 455/442; 370/311; 370/335; 370/252; 370/469; 370/328; 370/235
(58) Field of Classification Search ............... 455/436, 455/437, 442, 452; 370/311, 335, 252, 328, 370/469, 235, 338, 329, 230, 331, 412
See application file for complete search history.

(56) References Cited

U.S. PATENT DOCUMENTS

| | | | | |
|---|---|---|---|---|
| 4,696,027 A * | 9/1987 | Bonta | .......................... | 455/436 |
| 5,282,222 A * | 1/1994 | Fattouche et al. | ............ | 375/260 |
| 5,371,734 A * | 12/1994 | Fischer | ......................... | 370/311 |
| 5,884,163 A * | 3/1999 | Hardouin | ..................... | 455/423 |
| 5,966,655 A * | 10/1999 | Hardouin | ..................... | 455/418 |
| 6,069,883 A * | 5/2000 | Ejzak et al. | .................. | 370/335 |
| 6,088,335 A * | 7/2000 | I et al. | .......................... | 370/252 |
| 6,161,013 A * | 12/2000 | Anderson et al. | ............ | 455/437 |
| 6,205,125 B1 * | 3/2001 | Proctor et al. | ................ | 370/328 |
| 6,272,148 B1 * | 8/2001 | Takagi et al. | ................. | 370/469 |
| 6,381,458 B1 * | 4/2002 | Frodigh et al. | ............... | 455/442 |
| 6,542,742 B2 * | 4/2003 | Schramm et al. | ............ | 455/436 |
| 6,724,740 B1 * | 4/2004 | Choi et al. | ................... | 370/335 |

(Continued)

FOREIGN PATENT DOCUMENTS

JP 2001-238248 8/2001

(Continued)

*Primary Examiner*—Rafael Pérez Gutiérrez
*Assistant Examiner*—Joseph Arevalo
(74) *Attorney, Agent, or Firm*—Townsend and Townsend and Crew LLP (57) ABSTRACT

When an access terminal is handed off, requested-data-rate information based on a data rate control signal from each access terminal, average throughput of each access terminal before handoff, and a handoff request count are obtained from a base transceiver subsystem. A throughput after handoff of each access terminal is estimated from a ratio of the data rate information of each access terminal to the number of connected access terminals, and an estimated throughput ratio representing the degree of change from the average throughput of each access terminal before handoff to the estimated throughput is calculated. If the estimated throughput ratio is lower than or equal to a given value, the corresponding access terminal is not handed off. If the estimated throughput ratio is higher than the given value, the access terminal having the highest estimated throughput among access terminals requesting handoff is handed off.

12 Claims, 10 Drawing Sheets

U.S. PATENT DOCUMENTS

| | | | |
|---|---|---|---|
| 6,760,587 B2 * | 7/2004 | Holtzman et al. | 455/436 |
| 6,791,968 B2 * | 9/2004 | Kotzin | 370/348 |
| 6,807,426 B2 * | 10/2004 | Pankaj | 455/453 |
| 6,810,256 B2 * | 10/2004 | Stuempert et al. | 455/439 |
| 6,842,619 B2 * | 1/2005 | Lee et al. | 455/453 |
| 2002/0160783 A1 * | 10/2002 | Holtzman et al. | 455/452 |
| 2003/0031130 A1 * | 2/2003 | Vanghi | 370/235 |
| 2003/0069043 A1 * | 4/2003 | Chhaochharia et al. | 455/561 |
| 2003/0081538 A1 * | 5/2003 | Walton et al. | 370/206 |
| 2003/0125025 A1 * | 7/2003 | Lim | 455/435 |
| 2003/0223396 A1 * | 12/2003 | Tsai et al. | 370/342 |
| 2004/0085892 A1 * | 5/2004 | Walton et al. | 370/208 |
| 2004/0085909 A1 * | 5/2004 | Soliman | 370/252 |
| 2004/0152478 A1 * | 8/2004 | Ruohonen et al. | 455/502 |
| 2004/0179492 A1 * | 9/2004 | Zhang et al. | 370/331 |
| 2004/0219917 A1 * | 11/2004 | Love et al. | 455/436 |
| 2004/0223507 A1 * | 11/2004 | Kuchibhotla et al. | 370/428 |

FOREIGN PATENT DOCUMENTS

| | | |
|---|---|---|
| JP | 2003-219451 | 7/2003 |

* cited by examiner

| DATA RATE (kbit/s) | C／I (dB) |
|---|---|
| 38.4 | -12.5 |
| 76.8 | -9.5 |
| 153.6 | -6.5 |
| 307.2 | -4.0 |
| 614.4 | -1.0 |
| 921.6 | 1.3 |
| 1228.8 | 3.0 |
| 1843.2 | 7.2 |
| 2457.6 | 9.5 |

HANDOFF CONTROL METHOD, BASE STATION CONTROLLER, AND BASE TRANSCEIVER SUBSYSTEM

BACKGROUND OF THE INVENTION

1. Field of the Invention

The present invention relates to handoff control methods, base station controllers, and base transceiver subsystems in mobile radio communication systems.

2. Description of the Related Art

In a CDMA radio communication system, radio waves sent from an antenna of a base transceiver subsystem to an access terminal diminish as the distance from the base transceiver subsystem increases. The radio waves finally do not reach the access terminal. The reach of radio waves is handled as a service area, and communication services are provided for a plurality of access terminals within the service area.

In the communication system described above, the access terminal must transfer its own location information to the network. Accordingly, the terminal always sends its current location information to the base transceiver subsystem. The base transceiver subsystem holds the location information sent from the plurality of access terminals within the local zone and enables data communication with the network. If the access terminal moves toward an adjacent zone during data communication, radio waves sent from the current base transceiver subsystem are gradually attenuated, radio interference from the adjacent base transceiver subsystem increases, and the quality of service decreases. Then, the communication is switched to the adjacent zone that can provide a good radio environment (the radio channel is switched), so that stable communication is maintained. This technology is referred to as a handoff control method.

A representative handoff control method is soft handoff. When the access terminal moves in the middle of communication, the soft handoff method establishes a radio channel to an adjacent base transceiver subsystem while maintaining the radio channel to the current base transceiver subsystem, and allows communication with a base transceiver subsystem that provides a better radio environment.

One soft handoff method disclosed in patent document 1 (Japanese Unexamined Patent Application Publication No. 2001-238248) is outlined as follows: One access terminal (AT) can simultaneously connect radio channels to a plurality of base transceiver subsystems (BTSs); The strength of a pilot signal from each BTS is always monitored; When the signal strength exceeds a given threshold, handoff to the corresponding BTS is carried out.

The conventional handoff control methods judge that a radio environment is good if the pilot signal is sufficiently strong.

The AT monitors a carrier-to-interference-power ratio (C/I), or a ratio of the strength C of the pilot signal to the interference signal I from the adjacent BTS. The AT specifies the transmission rate (throughput) of a forward link channel (from the base transceiver subsystem to the access terminal) in accordance with C/I. The AT sends a data rate control signal (DRC) including data rate information that requests the base transceiver subsystem to perform data communication at the specified throughput. The BTS that receives DRC specifies the highest possible transmission rate and starts communicating with the AT accordingly.

The radio signal used in the radio channel includes control data such as the pilot signal and traffic data such as voice conversation data and moving picture data. The traffic data is hereafter referred to as communication data.

Figure 1:
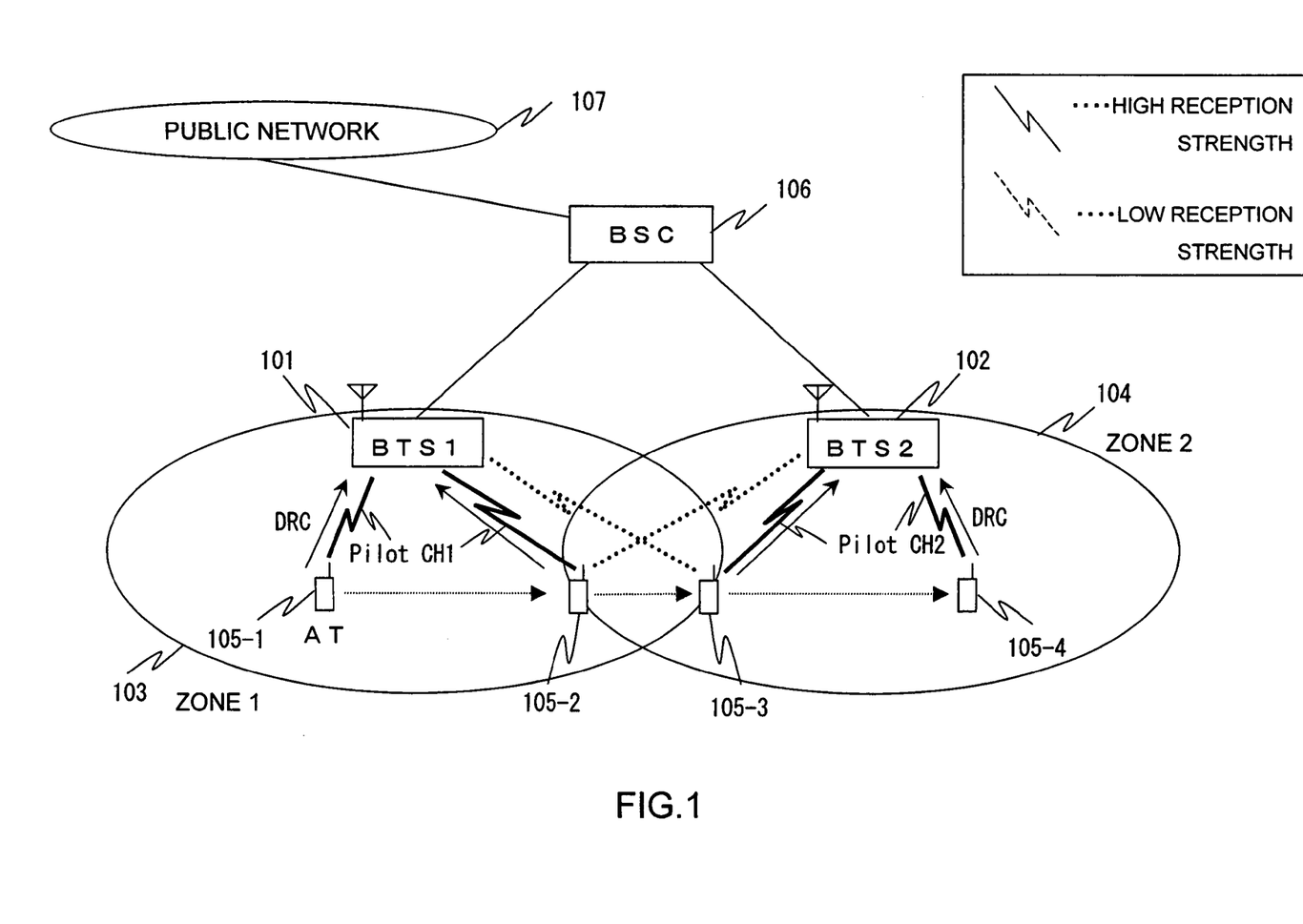
FIG. 1 shows the configuration of a conventional CDMA radio communication system.

FIG. 1 shows the configuration of a conventional CDMA radio communication system.

FIG. 1 shows that an AT which is receiving a Pilot CH1 signal from BTS1 101 in a position 105-1 moves in a first zone 103 toward BTS2 102, and reaches a position 105-2. The position is on the boundary of the first zone 103 and a second zone 104, and a Pilot CH2 signal from BTS2 102 can also be received there. A solid line representing radio waves indicates that the radio signal is received with a high strength while a broken line indicates that the strength is low.

If C/I of the Pilot CH2 signal from BTS2 102 exceeds a channel assignment threshold T_ADD when the AT is going to move from the position 105-2 to a position 105-3, the AT notifies a base station controller (BSC) 106 that the Pilot CH2 signal of BTS2 102 becomes a candidate for handoff, in the position 105-2 through BTS1.

The BSC 106 receives the notification and starts allocating a radio channel between the AT in the position 105-2 and BTS2 102. Now, the AT has two radio channels: one connected to BTS1 101 and the other connected to BTS2 102 (two-way state). Communication data is transferred in either of the two radio channels.

When the AT moves further to the position 105-3, C/I of BTS2 102 exceeds C/I from BTS1 101, and the communication is switched to BTS2 102. When the AT reaches a position 105-4, C/I of BTS1 101 falls below a communication capability threshold T_DROP. The Pilot CH1 signal of BTS1 101 is eliminated from the candidates for handoff, and the corresponding radio channel is disconnected. Then, the AT in the position 105-4 can communicate with BTS2 102 alone.

In the conventional handoff control system, the access terminal gives high priority to the strength of radio waves, and handoff is carried out to obtain a higher momentary transmission rate. No consideration is given to load statuses such as the total throughput and the number of channels connected to the base transceiver subsystem of the handoff destination. If the base transceiver subsystem of the handoff destination is congested, the user throughput may often decrease due to transmission scheduling on the side of the base transceiver subsystem, despite a good radio environment.

Moreover, because handoff control is performed irrespective of the congestion of the base transceiver subsystem, imbalances may be created among access terminals handed off to base transceiver subsystems.

SUMMARY OF THE INVENTION

Accordingly, it is an object of the present invention to perform handoff to an environment where the user can obtain a higher throughput. When handoff of an access terminal to a base transceiver subsystem is taking place, a base transceiver subsystem side estimates a user throughput at the handoff destination, calculates a value relative to the ratio of the estimated throughput to the current user throughput (estimated throughput ratio indicating the degree of a change expected from the handoff), and executes handoff in accordance with the estimated throughput ratio. Therefore, the user in the vicinity of the boundary of the zones managed by different base transceiver sybsystems is handed off only when an increase in throughput is expected.

Another object of the present invention is to ease imbalances in the number of access terminals in different zones by handing off an access terminal having the highest estimated throughput ratio successively. If an access terminal is in the vicinity of the boundary of a plurality of zones (at almost equal distances from the corresponding base transceiver subsystems), a free zone is always selected, so that a high user throughput can be obtained.

A further object of the present invention is to overcome excessive handoff iterations associated with best-effort networks, and to bring the load of the base transceiver subsystems into balance.

According to the first solving means, there is provided

A handoff control method for use in a radio communication system which includes a base station controller, a base transceiver subsystem, and a plurality of access terminals and performs handoff control to switch an access terminal from one base transceiver subsystem to another base transceiver subsystem, the handoff control method, when one or more access terminals are moving from a first zone to a second zone during communication and when communication in the second zone becomes possible, comprising:

a step of obtaining data rate information indicating a requested data rate corresponding to each access terminal in accordance with a data rate control signal for providing requested-data-rate information to the base transceiver subsystems;

a step of obtaining an average throughput before handoff of each access terminal, a handoff request count to a destination zone of a handoff request, and the number of access terminals connected in the destination zone of the handoff request;

a step of estimating a throughput after handoff of each access terminal in accordance with a ratio of the data rate information of each access terminal to the number of connected access terminals, and estimating a throughput ratio after handoff of each access terminal, the estimated throughput ratio representing a degree of change from the average throughput of each access terminal before handoff to the estimated throughput after handoff; and a step of suspending handoff of an access terminal if the estimated throughput ratio is lower than or equal to a given threshold, and executing handoff of an access terminal for which the highest throughput ratio is estimated among the access terminals requesting handoff if the estimated throughput ratio is higher than the given threshold.

According to the second solving means, there is provided

A base station controller in a radio communication system which includes the base station controller, a base transceiver subsystem, and a plurality of access terminals, and performs handoff control to switch an access terminal from one base transceiver subsystem to another base transceiver subsystem, when one or more access terminals moving from a first zone where communication is in progress to a second zone become ready to communicate in the second zone, the base station controller comprising:

a storage block for storing information related to the access terminal in the zones and information related to handoff;

a throughput estimation block for estimating a throughput;

a comparison/determination block for determining whether to execute or suspend handoff, in accordance with the result of the calculation made by the throughput estimation block; and a handoff control block for executing or suspending handoff, and the throughput estimation block receiving the average data rate before handoff of each access terminal from the base transceiver subsystem of the first zone and receiving a data rate control signal for providing requested data rate information for the base transceiver subsystems, from the base transceiver subsystem of the first zone or the second zone;

obtaining data rate information representing a requested data rate corresponding to each access terminal, in accordance with the received data rate control signal;

obtaining a handoff request count to the destination zone of a handoff request and the number of access terminals connected in the destination zone of the handoff request, from the storage block; and estimating a throughput after handoff of each access terminal in accordance with a ratio of the data rate information of each access terminal to the number of connected access terminals, and estimating a throughput ratio after handoff of each access terminal, the estimated throughput ratio representing a degree of change from the average throughput before handoff of each access terminal to the estimated throughput after handoff;

the comparison/determination block comparing the estimated throughput ratio and a given threshold; and the handoff control block suspending handoff of an access terminal if the estimated throughput ratio is lower than or equal to the given threshold, and executing handoff of an access terminal having the highest value among the access terminals requesting handoff if the estimated throughput ratio is higher than the given threshold.

According to the third solving means, there is provided

A base transceiver subsystem in a radio communication system which includes a base station controller, the base transceiver subsystem, and a plurality of access terminals, and performs handoff control to switch an access terminal from one base transceiver subsystem to another base transceiver subsystem, when one or more access terminals moving from a first zone where communication is in progress to a second zone become ready for communication in the second zone, the base transceiver subsystem comprising:

a storage block for storing information related to the access terminals in the zones and information related to handoff;

a throughput estimation block for estimating a throughput;

a comparison/determination block for determining whether to execute or suspend handoff, in accordance with the result of calculation made by the throughput estimation block;

a handoff control block for executing or suspending handoff; and a throughput calculation block for calculating the average throughput of each access terminal, and the throughput estimation block obtaining data rate information representing a requested data rate corresponding to each access terminal, in accordance with the data rate control signal for providing requested-data-rate information for the base transceiver subsystems;

obtaining the average throughput of each access terminal before handoff, from the throughput calculation block;

obtaining a handoff request count to the destination zone of a handoff request and the number of access terminals connected in the destination zone of the handoff request, from the storage block; and estimating a throughput after handoff of each access terminal in accordance with a ratio of the data rate information of each access terminal to the number of connected access terminals and estimating a throughput ratio after handoff of each access terminal, the estimated throughput ratio representing a degree of change from the average throughput of each access terminal before handoff to the estimated throughput after handoff;

the comparison/determination block comparing the estimated throughput ratio with a given threshold;

the handoff control block suspending handoff of an access terminal if the estimated throughput ratio is lower than or equal to the given threshold, and executing handoff of an access terminal having the highest value among the access terminals requesting handoff if the estimated throughput ratio is higher than the given threshold.

According to the present invention, when handoff of an access terminal to a base transceiver subsystem is taking place, a base transceiver subsystem side estimates a user throughput at the handoff destination, calculates a value relative to the ratio of the estimated throughput to the current user throughput (estimated throughput ratio indicating the degree of change expected from the handoff), and executes handoff in accordance with the estimated throughput ratio. Therefore, the user in the vicinity of the boundary of the zones managed by different base transceiver subsystems is handed off only when an increase in throughput is expected. Handoff will bring the user into an environment where a higher throughput can be obtained.

According to the present invention, an access terminal having the highest estimated throughput ratio is successively handed off. If the access terminal is in the vicinity of the boundary of a plurality of zones (at almost equal distances from the corresponding base transceiver subsystems), a free zone is always selected, so that a high user throughput can be obtained. Imbalances in the number of access terminals among the zones can be eased.

Further, according to the present invention, excessive handoff iterations associated with best-effort networks can be overcome, and the load of the base transceiver subsystems can be brought into balance.

DESCRIPTION OF THE PREFERRED EMBODIMENTS

Figure 2:
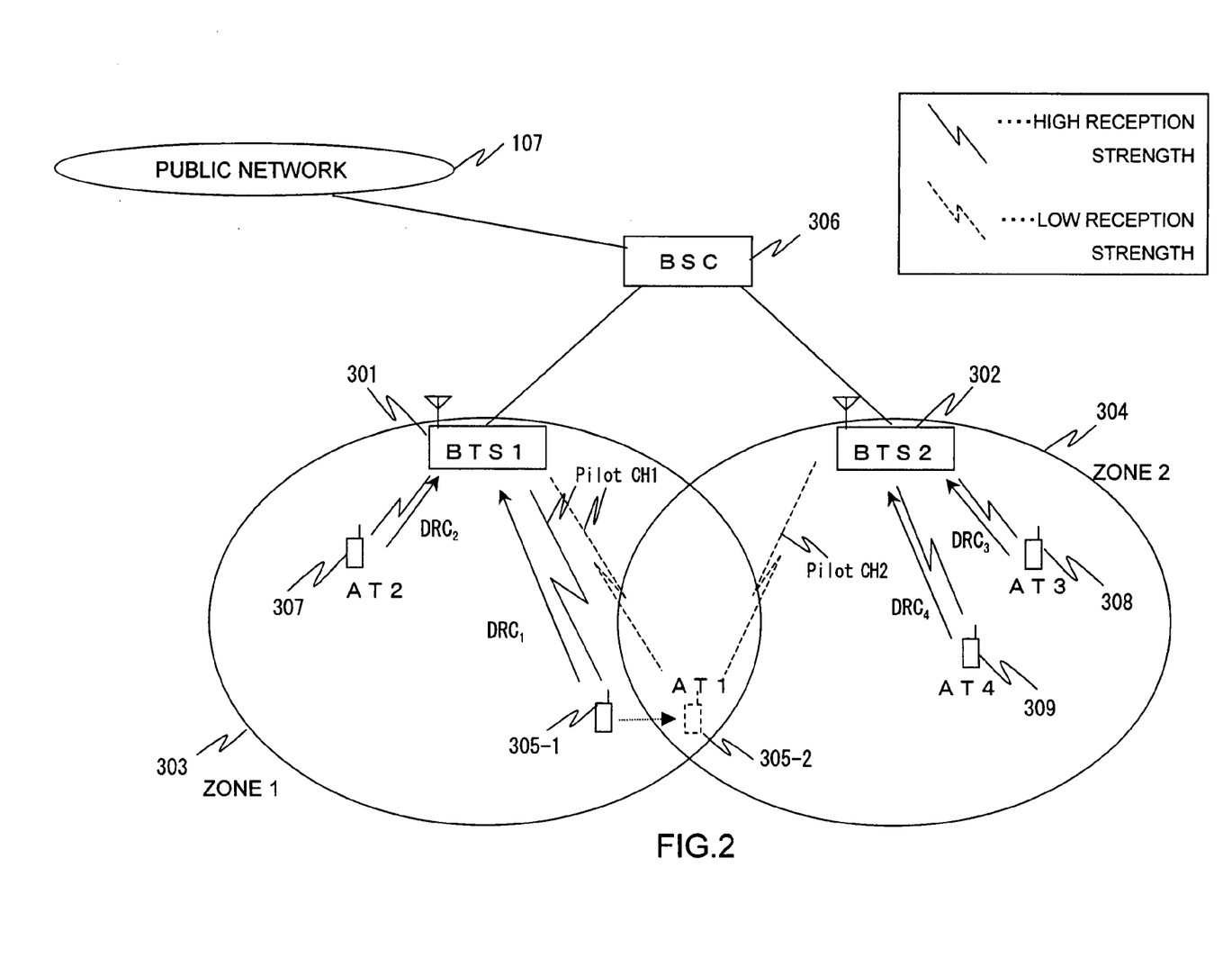
FIG. 2 shows a configuration of a mobile communication system according to an embodiment of the present invention.
Figure 3:
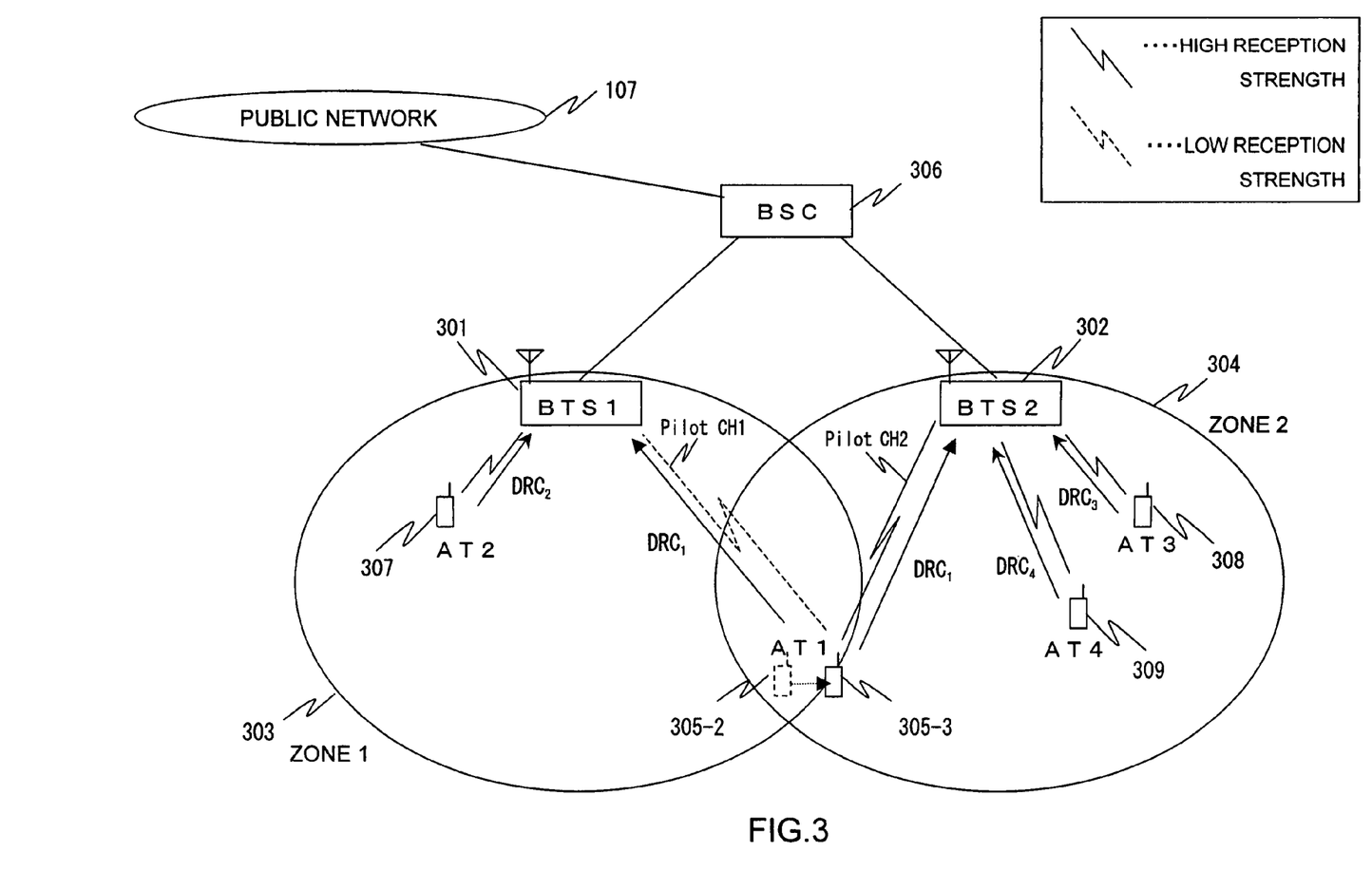
FIG. 3 shows another configuration of the mobile communication system of the embodiment.

FIGS. 2 and 3 show configurations of a mobile communication system according to an embodiment of the present invention.

Two access terminals AT1 in a position 305-1 and AT2 in a position 307 are communicating with BTS1 301 in a first zone 303, and two access terminals AT3 in a position 308 and AT4 in a position 309 are communicating with BTS2 302 in a second zone 304. BTS1 301 and BTS2 302 are wired through a BSC 306 to a public network 107 such as an IP network. A solid line representing radio waves indicates that the radio signal is received with a high strength while a broken line indicates that the strength is low.

FIG. 2 shows that AT1 is moving from the position 305-1 to a position 305-2. During the movement from the position 305-1 to the position 305-2, which is close to BTS2 302, the AT1 keeps receiving the Pilot CH1 signal from BTS1 301 in the first zone 303. The position 305-2 is on the boundary of the first zone 303 and the second zone 304, and the Pilot CH2 signal from BTS2 302 can also be received there. FIG. 3 shows that the AT1 moves further to a position 305-3.

Figure 4:
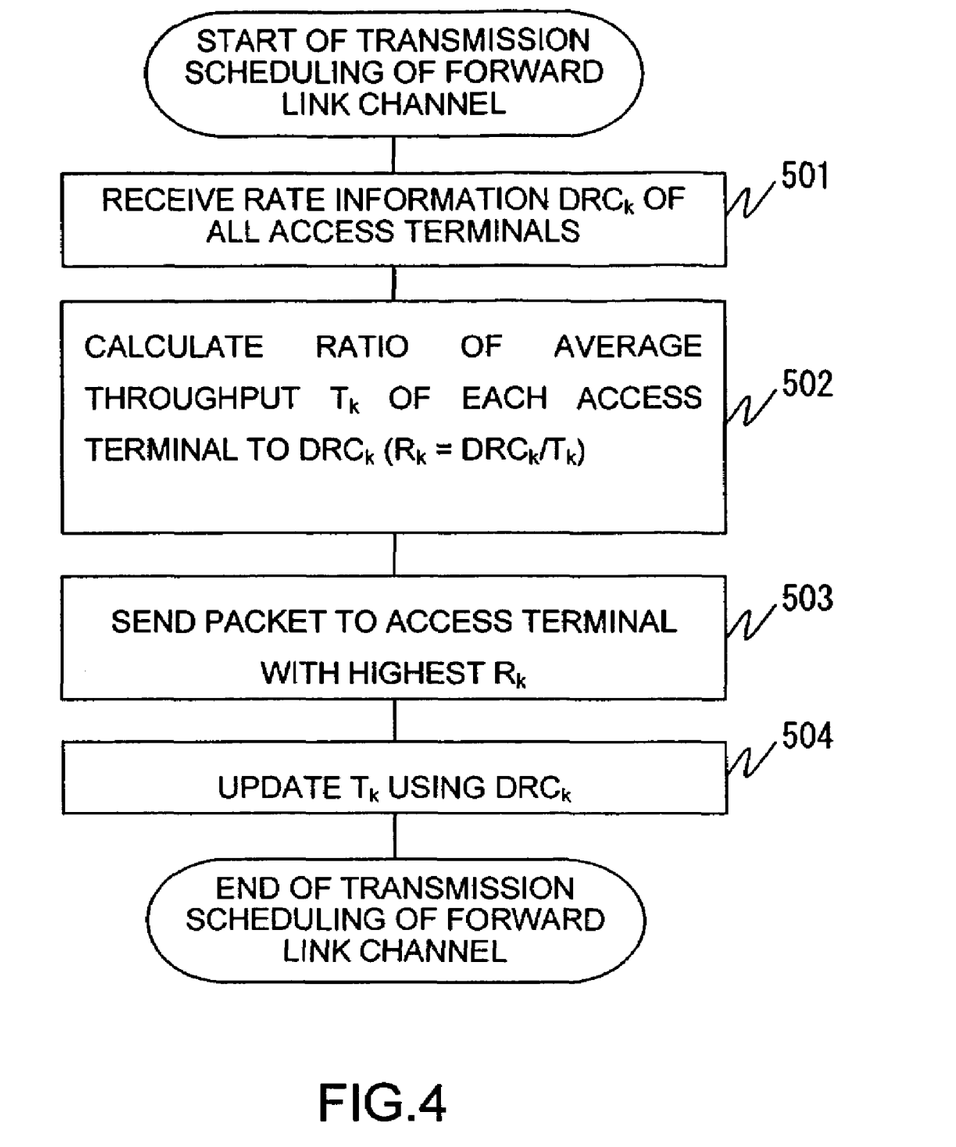
FIG. 4 shows a flowchart of transmission scheduling in a forward link channel by a base transceiver subsystem.

FIG. 4 shows a flowchart of transmission scheduling in a forward link channel by the base transceiver subsystem.

AT1 in the position 305-1 and AT2 in the position 307 are communicating with BTS1 301 in the first zone 303, as shown in FIG. 2. Each AT specifies DRC in accordance with self-measured C/I and sends DRC to BTS1 301.

In step 501, BTS1 301 receives DRC sent from a plurality of ATs. In step 502, the BTS calculates the ratio $R_k$ of average throughput $T_k$ of the ATs to data rate information $DRC_k$. Data rate information $DRC_k$ is used to request the base transceiver subsystem to set a forward link channel transmission rate or throughput in accordance with C/I monitored by the AT. Subscript k represents an AT management number or an AT identification number. The subscript for AT1 305 is 1, and the subscript for AT2 is 2, for instance. In step 503, BTS1 301 sends slot allocation to an AT having the highest $R_k$. In step 504, BTS1 301 updates $T_k$ by using $DRC_k$ in a well-known or publicly-known expression. In the second zone 304, two access terminals AT3 in the position 308 and AT4 in the position 309 are communicating with BTS2 302, and BTS2 302 performs the same scheduling for the two access terminals.

Figure 5:
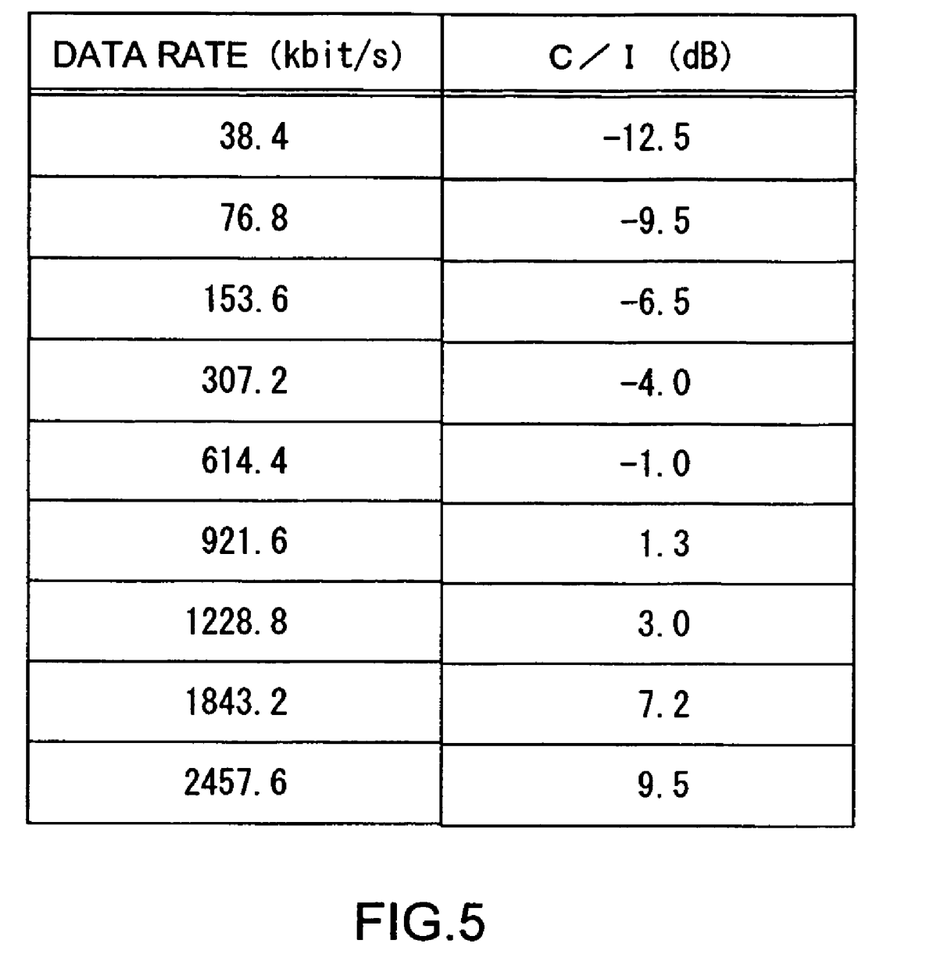
FIG. 5 is a data table listing data rates and C/I in the forward link channel.

FIG. 5 is a data table listing data rates and C/I in a forward link channel.

This table is used to specify a data rate control signal described above, and lists data rates corresponding to C/I. If C/I within the range of −12.5 dB≦C/I<−9.5 dB is obtained, communication can be performed at a rate of 38.4 kb/s. If C/I within the range of −9.5 dB≦C/I<−6.5 dB is obtained, communication can be performed at a rate of 76.8 kb/s. A data rate corresponding to C/I is sent to the BTS as DRC.

Figure 6:
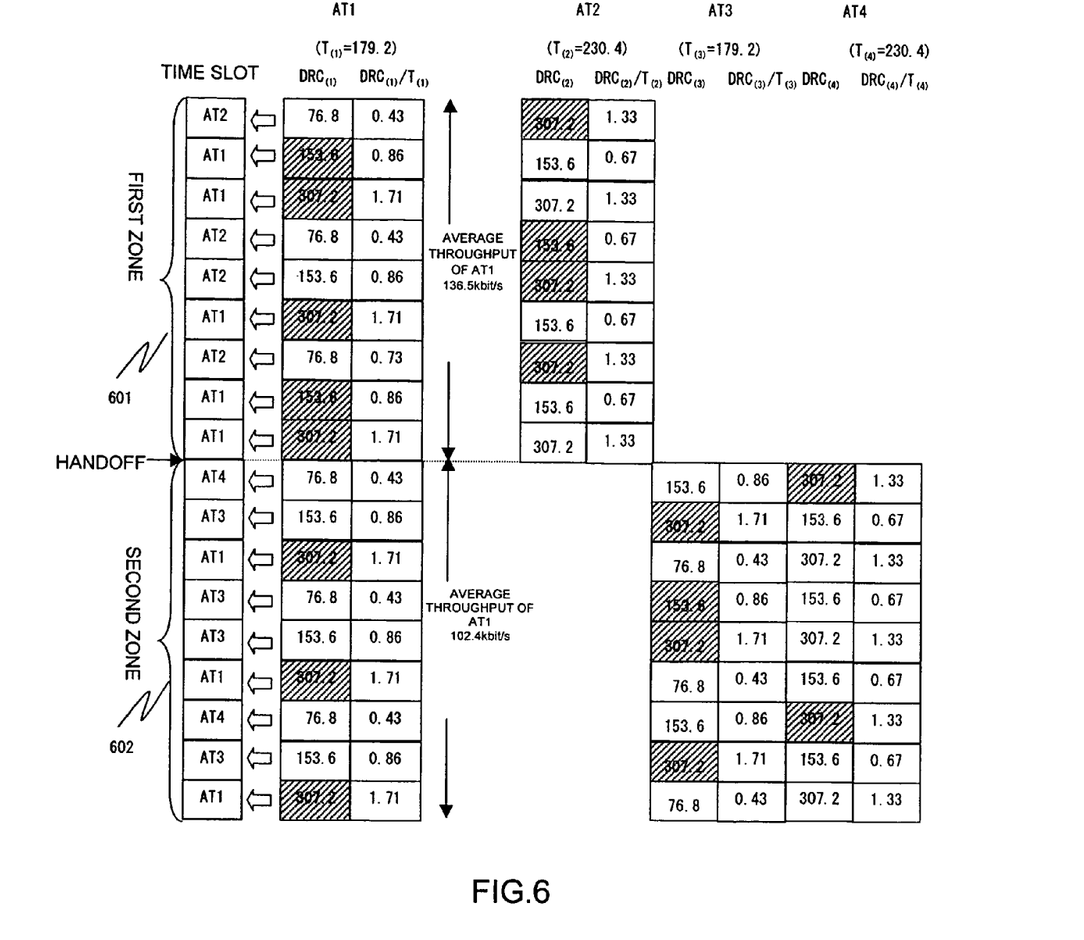
FIG. 6 shows an example of transmission scheduling in a first zone and in a second zone before and after handoff of AT1.

FIG. 6 shows transmission scheduling 601 in the first zone 303 and transmission scheduling 602 in the second zone 304 before and after handoff of AT1 resulting from the movement from the position 305-1 to the position 305-3.

The scheduling described above assigns five of the nine slots to AT1 communicating with BTS1 301, in the position 305-1 of the first zone 303. The average throughput of AT1 305 in the first zone is 136.5 kb/s.

$DRC_{(t)}$ is a user-requested data rate at time t. $T_{(t)}$ is the average transmission rate for the data already sent to the user by time t (average throughput). The BTS allocates a slot to a user having the highest DRC/T value and sends a packet to the user (see hatched boxes in the figure).

After a while, AT1 moves from the position 305-1 and enters the second zone 304, is handed off to BTS2 302, and reaches the position 305-3. BTS2 302 also performs the scheduling as described above. AT1 in the position 305-3 is given three of the nine slots, and the average throughput of AT1 in the position 305-3 in the second zone becomes 102.4 kb/s.

The handoff to switch the communication of AT1 305 to BTS2 302 means that AT1 305 is handed off from the first zone, where five of nine slots are allocated, to the second zone, where three of nine slots are allocated, substantially decreasing the throughput of AT1 305. This would occur if handoff control is performed with high priority given to the strength of radio waves. The conventional method is not convenient for AT users because it sometimes carries out such handoff that the throughput decreases.

In this embodiment, the problem as described above is avoided. Handoff is suspended if a decrease in throughput is estimated, and handoff is executed only when an increase in throughput is expected.

The handoff control method of this embodiment will be described next in further detail, with reference to FIGS. 2, 3, 7, and 8.

Figure 7:
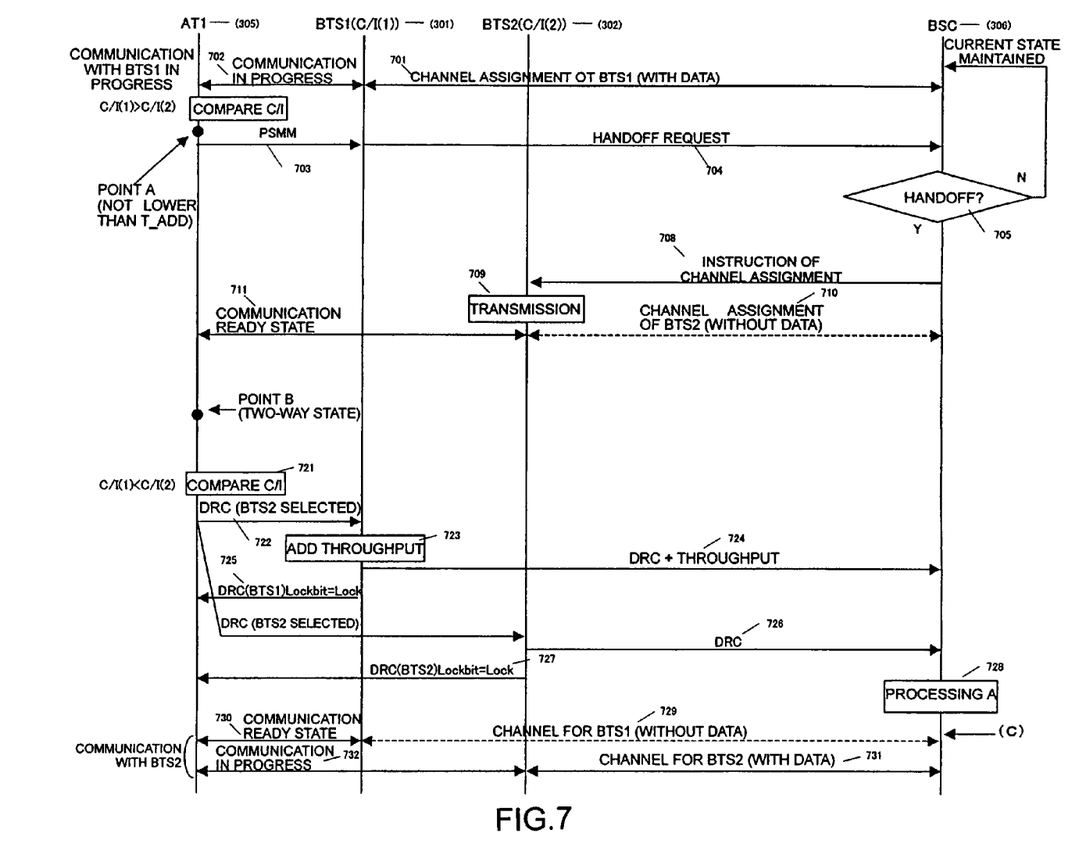
FIG. 7 shows a handoff control sequence of the embodiment.
Figure 8:
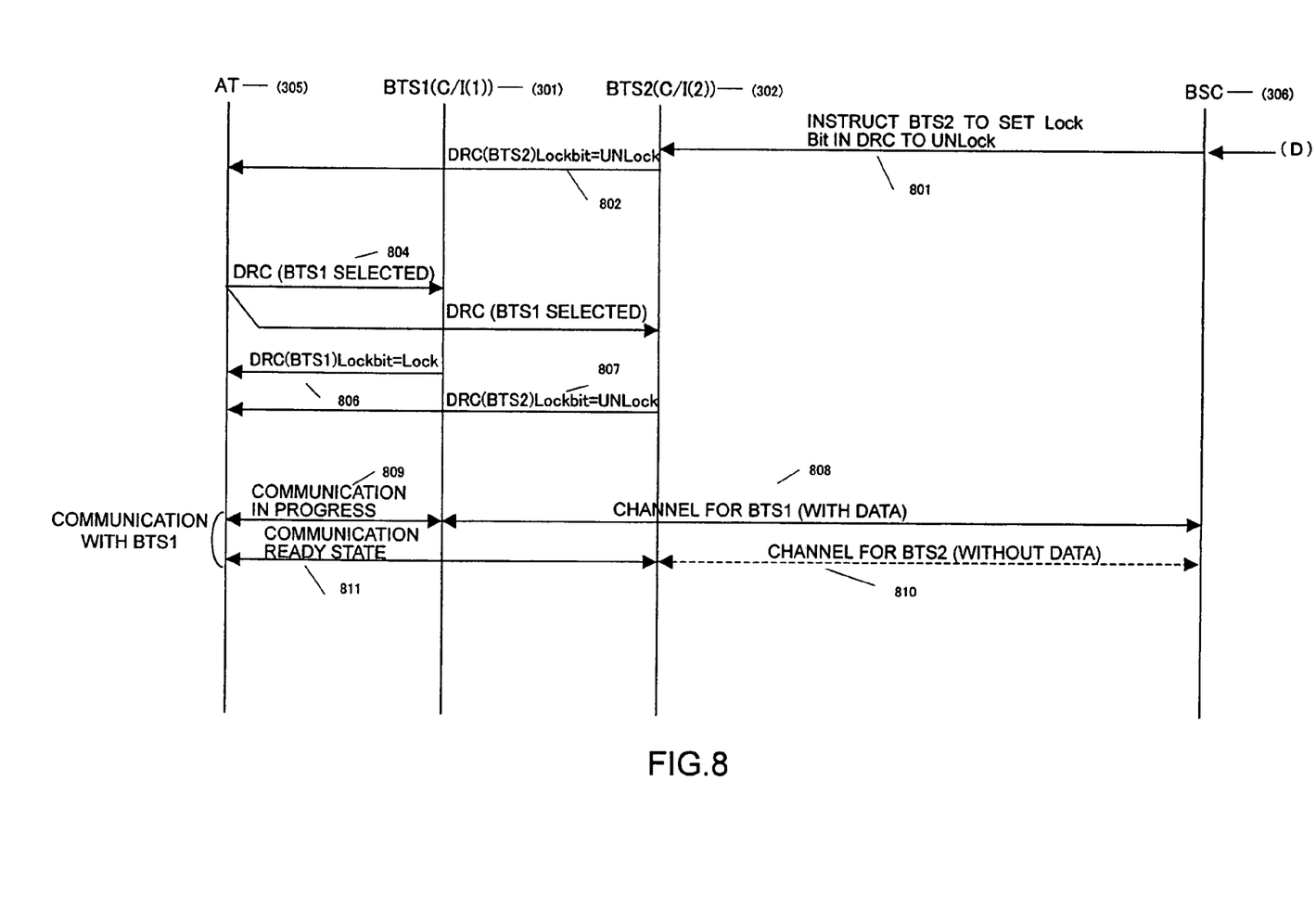
FIG. 8 shows another handoff control sequence of the embodiment.

FIGS. 7 and 8 show handoff control sequences of this embodiment.

AT1 in the position 305-1 is communicating with BTS1 301. The BSC 306 allocates a channel to BTS1 in step 701 and performs communication by sending data to the channel in step 702.

After the movement from the position 305-1 to the position 305-2, AT1 starts receiving a pilot signal also from BTS2 302, and the C/I thresholds of the two BTSs are calculated. C/I of BTS1 301 is denoted as C/I(1), and C/I of BTS2 302 is denoted as C/I(2). If C/I(2) calculated from the pilot signal received from BTS2 302 exceeds T_ADD (point A in FIG. 7), a pilot strength measurement message (PSMM) signal is sent through BTS1 301 to the BSC 306 in steps 703 and 704.

The BSC 306 receives the PSMM signal and judges whether to hand off AT1 305 to BTS2 302, in step 705. If the BSC 306 determines to execute handoff, the BSC 306 notifies BTS2 302 of the call channel to be assigned to AT1 305, in step 708. BTS2 302 performs transmission processing in the radio communication channel to AT1 305 in step 709, and starts transmission in the forward link traffic channel. In step 710, the BSC 306 assigns a channel to BTS2 and is not transmitting data in the channel. In step 711, the channel is ready for communication and waiting for data to be transmitted.

This is the two-way state described above: channels are assigned to both BTS1 301 and BTS2 302.

While the two channels to BTS1 301 and BTS2 302 are connected, AT1 305 periodically measures and compares C/I of both BTSs in step 721. Then, AT1 305 selects a BTS having a larger C/I and sends DRC including the information of the selected BTS to both BTS1 and BTS2 in step 722. When AT1 305 moves to the position 305-3 and when C/I of BTS2 302 becomes larger than C/I of BTS1 301, DRC indicating that BTS2 302 is selected is sent. BTS1 301 which has been in communication with AT1 305 receives DRC and sends DRC to the BSC 306 in step 724, with the addition of the throughput information of AT1 305 obtained beforehand. BTS2 302, which has a channel but has not been in communication with AT1 305, receives DRC and sends just DRC to the BSC 306 in step 726.

In the shown sequence, the DRC information in step 726 is the same as the DRC information sent in step 724, and the DRC information of step 726 does not need to be sent to the BSC 306. It is assumed here that handoff is always requested in one direction, from BTS1 to BTS2, but handoff may be actually requested in both directions. Accordingly, the DRC information may be sent also in step 726, with the addition of the throughput information obtained by BTS2 302. In the shown sequence, the BTS receives DRC from the AT and sends DRC and the relative throughput information to the BSC 306. The BTS may also send just the DRC information to the BSC 306 once, and then the BSC 306 may request the relative throughput information.

BTS1 301 and BTS2 302 receive DRC and send DRC back to AT1 305 with the lock bit set to Lock respectively in steps 725 and 727. The BSC 306 receives DRC and the added throughput information from BTS1 301 and receives just DRC from BTS2 302, performs processing A in step 728, which will be described in further detail with reference to FIG. 9, and determines whether the handoff will improve the throughput. Processing A is outlined as follows: The BSC 306 estimates a user throughput of AT1 305 in the handoff destination zone, obtains a value relative to the ratio of the estimated user throughput to the current user throughput (estimated throughput ratio representing the degree of change expected from the handoff), and judges whether to execute the handoff in accordance with the estimated throughput ratio.

If the handoff is expected to increase the throughput, the current data transmission in the channel of BTS1 (the slot is allocated by the BTS) is abandoned in step 729. Data is transmitted in the channel to BTS2 in step 731. In step 732, communication is performed between AT1 305 and BTS2 302.

In step 730, the channel assigned to BTS1 301 by the BSC 306 is present, and no data is transmitted in the channel. Communication in this channel can start anytime by transmitting data.

If the handoff is estimated to decrease the throughput (FIG. 8), the BSC 306 instructs BTS2 302 to set the DRC lock bit to UNLock in step 801. BTS2 302 receives the instruction, and sends DRC with the lock bit set to UNLock to, AT1 305 in step 802.

AT1 305 receives DRC (BTS2) with the lock bit set to UNLock and sends DRC indicating that BTS1 301 is selected, to both BTS1 301 and BTS2 302 in step 804, although C/I of BTS2 302 is higher than C/I of BTS1 301. BTS1 301 receives DRC and sends DRC to AT1 305 with the lock bit set to Lock, in step 806. In step 807, BTS2 302 sends DRC to AT1 305 with the lock bit set to UNLock under the Unblock instruction from the BSC 306, irrespective of whether DRC is received.

Now, the status becomes the same as that at point B in FIG. 7. The channels of both BTSs are connected, and data is transmitted in the channel of BTS1. AT1 305 is close to BTS2 302, from which strong radio waves are received, but handoff to BTS2 is suspended because of the estimated throughput after the handoff.

The C/I comparison is made whenever necessary after that, and step 721 and the subsequent steps are repeated. Accordingly, handoff of the AT to or from a zone can be dynamically performed, and the AT can always communicate with an BTS which can provide a high throughput.

Figure 9:
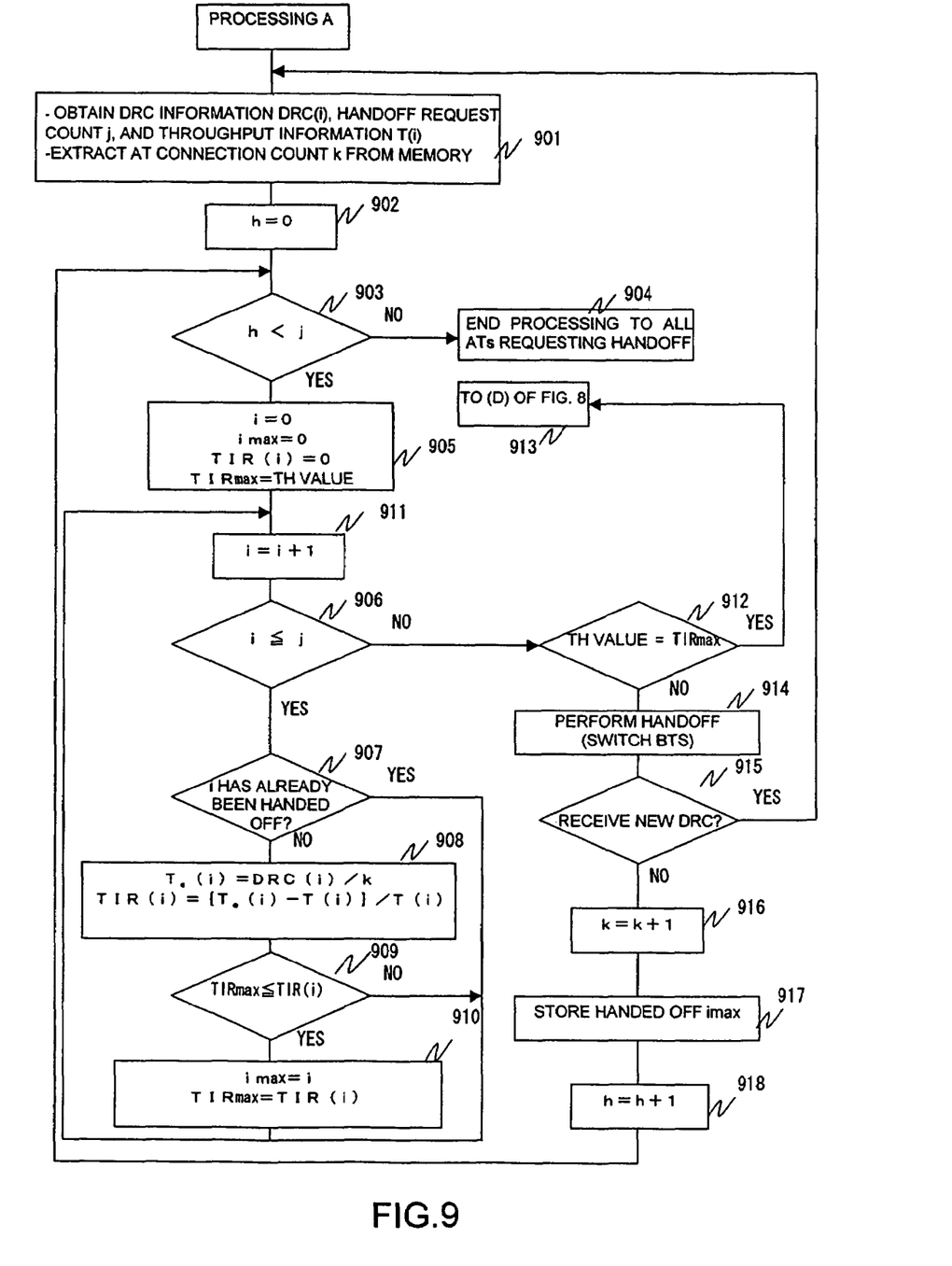
FIG. 9 is a flowchart showing the detailed sequence of processing A.

FIG. 9 is a flowchart showing the detailed sequence of processing A.

The shown sequence allows a plurality of ATs to make a handoff request concurrently and allows an AT to make a handoff request while processing A for a handoff request made by another AT is in progress.

If a plurality of ATs makes a handoff request concurrently, a single AT of which estimated throughput ratio is the highest and is greater than a given threshold (TH) is handed off. Whether one remaining AT is handed off as requested is judged by a throughput ratio estimated in the radio environment after the handoff of the single AT.

If AT(i) moving from the first zone 303 to the second zone 304 makes a handoff request (step 722 in FIG. 7), the BSC 306 receives DRC and the throughput information of AT(i) from BTS1 301 and DRC of AT(i) from BTS2 302, and obtains DRC information DRC(i), a handoff request count j, and throughput information T(i) of AT(i). DRC information DRC(i) is the information of a data rate which the terminal requests or hopes the base transceiver subsystem to give. The throughput information is the actual data rate of transmission from the base transceiver subsystem, or actual average throughput. Variable i in (i) represents an AT management number. Variable i for AT1 305 is 1, and variable i for AT2 is 2, for instance. The BSC 306 obtains from the memory, which will be described later, the number of ATs connected in the destination zone of the handoff request in step 901.

The BSC 306 initializes variable h for repeating the sequence as many times as the number of handoff requests, in step 902. In step 903, variable h is compared with the handoff request count j. If variable h is smaller than the handoff request count j, the BSC 306 goes to step 905. If variable h is not smaller than the handoff request count j, the BSC 306 goes to step 904. In step 904, the BSC assumes that the sequences for all the ATs that have made a handoff request are finished, and terminates the processing.

In step 905, the BSC 306 initializes variables i, imax, and TIR(i) to 0 and variable TIRmax to the TH value. The variables are defined as follows: imax is the management number of the AT with the highest estimated throughput ratio; TIR(i) is the estimated throughput ratio of the corresponding AT which makes a handoff request; TIRmax is the maximum value of the estimated throughput ratio of all the ATs that made a handoff request.

The BSC 306 increments variable i in step 911 and compares variables i and j in step 906. When the processing starts, i is 1 and is equal to or smaller than j. Therefore, the BSC 306 goes to step 907 and checks whether the corresponding handoff has been executed.

If variable i is the management number of the AT which has already been handed off, the BSC 306 increments variable i in step 911. If it is confirmed that AT(i) has not yet been handed off, the BSC 306 calculates the estimated throughput ratio of AT(i) in step 908.

In the calculation of the estimated throughput ratio, estimated throughput $T_e(i)$ after handoff in accordance with the obtained information is given by expression (1) below:

$$T_e(i)=DRC(i)/k \quad (1)$$

Expression (1) may be modified to expression (1a) below, where variable k is multiplied by $\alpha$, which is an availability factor in the radio service area, a data item held for statistics by the carrier. With this expression, handoff control will be carried out in consideration of actual operation.

$$T_e(i)=DRC(i)/(k*\alpha) \quad (1a)$$

The BSC 306 then calculates estimated throughput ratio TIR(i) of the AT, from current average throughput T(i) of the AT and estimated throughput $T_e(i)$ obtained by expression (1), by using expression (2) below.

$$TIR(i)=(T_e(i)-T(i))/T(i) \quad (2)$$

The BSC 306 compares TIR(i) given above with TIRmax (the initial value equals the TH value) in step 909. If TIR(i) is smaller than TIRmax, the BSC 306 does not respond to the handoff request of the AT and goes to step 911. If TIR(i) given above is greater than or equal to TIRmax, imax is assigned to i and TIRmax is assigned to TIR(i) in step 910. The BSC goes to step 911 and estimates throughput ratio TIR(i) of AT(i) which has the next management number and requests handoff.

The BSC 306 calculates TIR(i) of the ATs making a handoff request. If variable i is greater than variable j in step 906, the TH value and TIRmax are compared in step 912, because imax and TIRmax are specified in step 910. If TIRmax does not match the TH value, the BSC 306 hands off AT(i) in step 914 ((C) in FIG. 7). If TIRmax matches the TH value, the BSC 306 performs processing to suspend the handoff of AT(i) ((D) in FIG. 8).

The BSC 306 checks in step 915 whether a new handoff request, or DRC, is received after handoff is carried out in step 914. If yes, the BSC 306 goes to step 901, resets all the conditions, and starts the sequence. If the BSC 306 does not find new DRC in step 915, variable k is incremented in step 916 because the handoff increases the number of ATs connected in the requested handoff destination zone by one. The imax value, which is equal to variable i of AT(i) handed off in step 914, is stored in memory. The variable h for repeating this sequence as many times as the number of handoff requests is incremented in step 918. Then, the BSC 306 goes to step 903 and judges whether to hand off the AT having the next highest estimated throughput ratio among the ATs making a handoff request.

In this embodiment, the effectiveness of handoff is determined in accordance with the estimated throughput and the current throughput. If handoff of an AT is estimated to decrease the throughput, the AT is not handed off. If handoff of an AT is expected to improve the throughput, an AT having the highest TIR(i) is obtained and handed off (BTS is switched). After the handoff of the AT having the highest TIR(i), the number of users connected to the BTS at the handoff destination is increased by one, and handoff control is performed in the same way for the remaining ATs requesting handoff.

If some of ATs requesting handoff are handed off, the handoff destination zone becomes crowded, and the current zone becomes less crowded. The remaining ATs turn out to decrease their estimated throughput ratio. Thus, handoff control makes the situation stable. If an AT for which an increase in throughput ratio is estimated is always handed off, there may be an occasion that all ATs requesting handoff are handed off. This handoff would make the handoff destination zone too crowded, resulting in another iteration of handoff back to the original zone. The present invention sequentially hands off ATs for which the highest throughput ratio is estimated, so that the iterations of handoff can be avoided.

Figure 10:
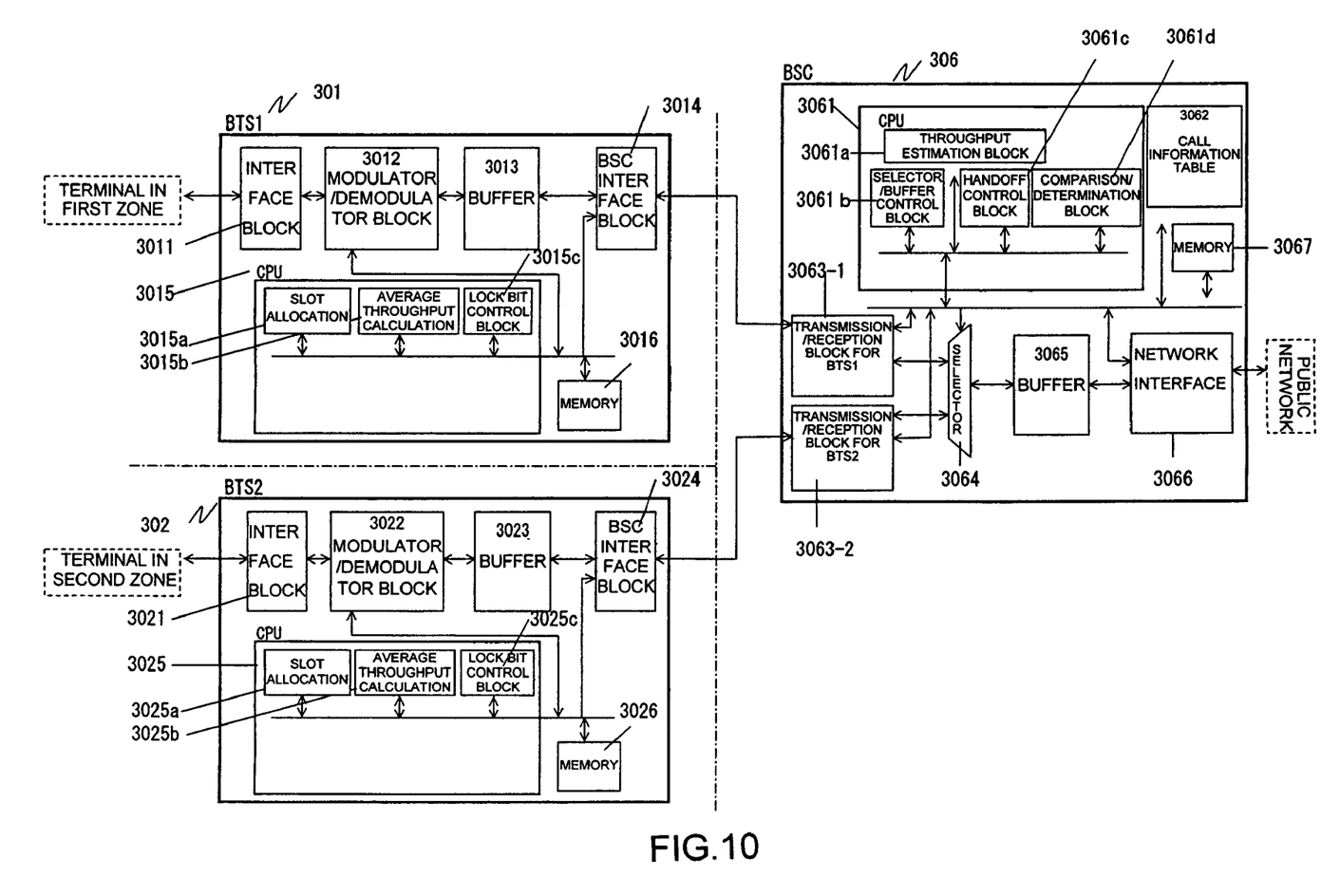
FIG. 10 is a block diagram showing base transceiver subsystems and a base station controller of the embodiment.

FIG. 10 is a block diagram showing the base transceiver subsystems and the base station controller of this embodiment.

The figure illustrates two base transceiver subsystems BTS1 301 and BTS2 302 and one base station controller BSC 306 in FIG. 3. BTS1 301 implements transmission scheduling, synchronous acquisition of a reception signal, and others. The BSC 306 implements connection control, handoff control, and other functions.

Because the base transceiver subsystems BTS1 301 and BTS2 302 have the same configuration, just BTS1 301 will be described.

BTS1 301 includes an interface block 3011 for sending and receiving data to and from an AT in the first zone 303, a modulator/demodulator block 3012, a buffer 3013 for storing transmission data and reception data temporarily, an BSC interface block 3014 for interfacing with the BSC 306, a CPU 3015 for controlling the entire BTS, and a memory 3016 for providing application programs and a work area of the programs. BTS1 performs data communication with an AT across a radio communication path.

The interface block 3011 includes an antenna, which is not shown, and the modulator/demodulator block 3012 performs modulation and demodulation by the phase shift keying (PSK) method or other methods for communication with the AT when necessary.

In a data flow from the AT to the BSC 306, when a radio signal is received from the AT, the modulator/demodulator block 3012 demodulates the signal, and the electric signal is transferred through the buffer 3013 and the BSC interface block 3014 to the BSC 306. In a data flow from the BSC side, the signal is transferred to the AT in reverse order.

The CPU 3015 includes a slot allocation block 3015a for performing transmission scheduling, a throughput calculation block 3015b for calculating the throughput of each AT in the zone managed by BTS1 and the average throughput in the zone, and a lock bit control block 3015c for controlling the lock bit of DRC, which has been described with reference to FIGS. 7 and 8.

BTS1 301 receives DRC from an AT and sends DRC to the BSC 306 with the addition of the throughput information calculated by the throughput calculation block 3015b.

The BSC 306 includes a network interface block 3066 for interfacing with a public network 107, a buffer 3065 for temporality storing transmission data and reception data, a selector block 3064 for selecting a channel between the BSC 306 and a plurality of BTSs, a call information table 3062 for managing access terminal information in the zone, a CPU 3061 for controlling the entire BSC 306, a memory 307 for providing application programs and a work area for the programs, and a transmission/reception block 3063-n (n is 1 or a greater natural number indicating the number of BTSs) for sending and receiving data from each BTS.

The CPU 3061 includes a throughput estimation block 3061a, a selector/buffer control block 3061b, a handoff control block 3061c, and a comparison/determination block 3061d.

The throughput estimation block 3061a estimates a throughput in the processing shown in FIG. 9 and mainly takes charge of processing other than steps 912 and 914 in FIG. 9. The selector/buffer control block 3061b controls the selector block 3064 and the buffer 3065 in accordance with the judgment made by the handoff control block 3061c and controls data transmission. The selector/buffer control block 3061b mainly takes charge of the processing of step 914 in FIG. 9. The handoff control block 3061c issues an instruction to set the lock bit to UNLock when handoff is performed or suspended and performs other processing necessary for executing or suspending handoff. The handoff control block 3061c mainly takes charge of the processing of step 914. The comparison/determination block 3061d compares the threshold with the estimated throughput ratio calculated by the throughput estimation block in the processing of FIG. 9 and determines whether to execute or suspend the handoff. The comparison/determination block 3061d mainly takes charge of the processing of step 912 in FIG. 9. The handoff request count j, throughput information T(i), AT connection count k, and other data necessary for the processing are stored in the call information table 3062 or the memory 3067. The CPU 3061 reads or writes necessary data.

While communication with an AT is in progress, the BTS calculates the current average throughput of the AT through transmission scheduling and notifies the BSC 306 of the average throughput information. The BSC 306 receives the throughput information, estimates a throughput by combining the call information provided in advance, such as the number of connected users, and performs handoff control of this embodiment.

In the embodiment of the present invention described above, the physically separated BSC and BTSs are connected.

One BSC and a plurality of BTSs may be combined in one unit, and this unit will produce the same effect. The combined unit may include a component equivalent to the CPU 3061 of the BSC 306 shown in FIG. 10 when necessary, and the component performs processing A illustrated by the flowchart shown in FIG. 9. The handoff request count i, throughput information T(i), AT connection count k, and other data necessary for the processing may be stored in and read from an internal memory or may be received from another apparatus.

What is claimed is:

1. A handoff control method for use in a radio communication system which includes a base station controller, a base transceiver subsystem, and a plurality of access terminals and performs handoff control by which an access terminal is switched from one base transceiver subsystem to another base transceiver subsystem, the handoff control method, when one or more access terminals are moving from a first base transceiver subsystem to a second base transceiver subsystem during communication and when communication in the second base transceiver subsystem becomes possible, for each of the one or more access terminals, comprising:

a step of obtaining information indicating a requested data rate included in a data rate control signal to the base transceiver subsystems;

a step of obtaining, at a time prior to calculating an estimated throughput, an average throughput, a handoff request count to the second base transceiver subsystem, and the number of access terminals connected to the second base transceiver subsystem;

a step of calculating the estimated throughput for each access terminal that requests handoff the calculating being based on said each access terminal having been handed off to the second base transceiver system, the calculating further being based on the information indicating a request data rate and the number of access terminals connected to the second base station subsystem, and calculating an estimated throughput ratio which represents a degree of change from the average throughput to the estimated throughput; and a step of preventing handoff of an access terminal if the estimated throughput ratio is lower than or equal to a given threshold, and executing handoff to the second base station subsystem of an access terminal having the highest throughput ratio among the one or more access terminals if the highest estimated throughput ratio is greater than the given threshold, wherein the throughput ratio of each access terminal is estimated by the following expressions:

$$Te(i)=DRC(i)/k$$

$$TIR(i)=(Te(i)-T(i))/T(i)$$

where i is an identification number of an access terminal, k is the number of access terminals connected in the second base transceiver subsystem, DRC(i) is the data rate information of access terminal AT(i), Te(i) is an estimated throughput, T(i) is the current average throughput, and TIR(i) is an estimated throughput ratio.

2. A handoff control method according to claim 1, wherein, if a plurality of access terminals requests handoff, one access terminal is handed off in accordance with the estimated throughput ratio, and then it is repeatedly judged whether to hand off the other access terminals requesting handoff in accordance with a throughput ratio estimated in the radio environment at the handoff destination with the access terminal added by handoff being taken into account.

3. A handoff control method according to claim 1, wherein the throughput is estimated further in accordance with an availability in the service area.

4. A handoff control method according to claim 1, further comprising:
 a step in which the base station controller or the base transceiver subsystem of the second base transceiver subsystem to which handoff is requested sends a data with a lock bit set to UNLock to the access terminal if a decrease in throughput is estimated after the handoff;
 a step in which the access terminal receives the data with the lock bit set to UNLock, and sends a data rate control signal selecting the base transceiver subsystem of the first base transceiver subsystem to the base transceiver subsystems of the first base transceiver subsystem and the second base transceiver subsystem although C/I of the base transceiver subsystem of the second base transceiver subsystem to which handoff is requested is higher than C/I of the base transceiver subsystem of the first base transceiver subsystem where communication is in progress;
 a step in which the base station controller or the base transceiver subsystem of the first base transceiver subsystem sends a data with the lock bit set to Lock to the access terminal; and
 a step in which the base station controller or the base transceiver subsystem of the second base transceiver subsystem sends a data with the lock bit set to UNLock to the access terminal.

5. A base station controller in a radio communication system which includes the base station controller, a base transceiver subsystem, and a plurality of access terminals, and performs handoff control by which an access terminal is switched from one base transceiver subsystem to another base transceiver subsystem,
 when one or more access terminals moving from a first base transceiver subsystem where communication is in progress to a second base transceiver subsystem become ready to communicate in the second base transceiver subsystem, for each of the one or more access terminals,
 the base station controller comprising:
 a storage block for storing information related to the access terminal in the base transceiver subsystems and information related to handoff;
 throughput estimation block for estimating a throughput;
 a comparison/determination block for determining whether to execute or prevent handoff, in accordance with the result of the calculation made by the throughput estimation block; and
 a handoff control block for executing or preventing handoff,
 the throughput estimation block:
  receiving the average data rate before handoff of each access terminal from the first base transceiver subsystem and receiving a data rate control signal to the base transceiver subsystems, from the first base transceiver subsystem or the second base transceiver subsystem;
  obtaining information indicating a requested data rate corresponding to each access terminal, in accordance with the received data rate control signal;
  obtaining, at a time prior to calculating an estimated throughput, an average throughput, a handoff request count to the second base transceiver subsystem, and the number of access terminals connected to the second base transceiver subsystem; and
  calculating the estimated throughput for each access terminal that requests handoff the calculating being based on said each access terminal having been handed off to the second base transceiver system, the calculating further being based on the information indicating a request data rate and the number of access terminals connected to the second base station subsystem, and calculating an estimated throughput ratio, which represents a degree of change from the average throughput to the estimated throughput,
 the comparison/determination block comparing the estimated throughput ratio and a given threshold,
 the handoff control block preventing handoff of an access terminal if the estimated throughput ratio is lower than or equal to a given threshold, and executing handoff to the second base station subsystem of an access terminal having the highest throughput ratio among the one or more access terminals if the highest estimated throughput ratio is greater than the given threshold,
 wherein the throughput ratio of each access terminal is estimated by the following expressions:

$Te(i)=DRC(i)/k$ $TIR(i)=(Te(i)-T(i))/T(i)$ where i is an identification number of an access terminal, k is the number of access terminals connected in the second base transceiver subsystem, DRC(i) is the data rate information of access terminal AT(i), Te(i) is an estimated throughput, T(i) is the current average throughput, and TIR(i) is an estimated throughput ratio.

6. A base station controller according to claim 5, wherein, if a plurality of access terminals request handoff, one access terminal is handed off in accordance with the estimated throughput ratio, and then it is repeatedly judged whether to hand off the other access terminals requesting handoff in accordance with a throughput ratio estimated in the radio environment at the handoff destination with the access terminal added by handoff being taken into account.

7. A base station controller according to claim 5, wherein the throughput is estimated further in accordance with an availability in the service area.

8. A base station controller according to claim 5, wherein the base station controller or the base transceiver subsystem of the second base transceiver subsystem to which handoff is requested sends a data with a lock bit set to UNLock to the access terminal if a decrease in throughput is estimated after the handoff;
 the access terminal receives the data with the lock bit set to UNLock, and sends a data rate control signal selecting the base transceiver subsystem of the first base transceiver subsystem to the base transceiver subsystems of the first base transceiver subsystem and the second base transceiver subsystem although C/I of the base transceiver subsystem of the second base transceiver subsystem to which handoff is requested is higher than C/I of the base transceiver subsystem of the first base transceiver subsystem where communication is in progress;
 the base station controller or the base transceiver subsystem of the first base transceiver subsystem sends a data with the lock bit set to Lock to the access terminal; and the base station controller or the base transceiver subsystem of the second base transceiver subsystem sends a data with the lock bit set to UNLock to the access terminal.

9. A base transceiver subsystem in a radio communication system which includes a base station controller, the base transceiver subsystem, and a plurality of access terminals, and performs handoff control by which an access terminal is switched from one base transceiver subsystem to another base transceiver subsystem,
when one or more access terminals moving from a first base transceiver subsystem where communication is in progress to a second base transceiver subsystem become ready for communication in the second base transceiver subsystem,
the base transceiver subsystem comprising:
a storage block for storing information related to the access terminals in the base transceiver subsystems and information related to handoff;
a throughput estimation block for estimating an throughput;
a comparison/determination block for determining whether to execute or prevent handoff, in accordance with the result of calculation made by the throughput estimation block;
a handoff control block for executing or preventing handoff; and
a throughput calculation block for calculating an average throughput of each access terminal,
the throughput estimation block:
obtaining data rate information representing a requested data rate corresponding to each access terminal, in accordance with the data rate control signal for providing requested-data-rate information for the base transceiver subsystems;
obtaining, at a time prior to calculating an estimated throughput, an average throughput of each access terminal before handoff, from the throughput calculation block, a handoff request count to the second base transceiver subsystem, and the number of access terminals connected in the second base transceiver subsystem, from the storage block; and
calculating the estimated throughput for each access terminal that requests handoff the calculating being based on said each access terminal having been handed off to the second base transceiver subsystem, the calculating further being based on the information indicating a request data rate and the number of access terminals connected to the second base station subsystem, and calculating an estimated throughput ratio, which represents a degree of change from the average throughput to the estimated throughput,
the comparison/determination block comparing the estimated throughput ratio with a given threshold,
the handoff control block preventing handoff of an access terminal if the estimated throughput ratio is lower than or equal to a given threshold, and executing handoff to the second base station subsystem of an access terminal having the highest throughput ratio among the one or more access terminals if the highest estimated throughput ratio is greater than the given threshold,
wherein the throughput ratio of each access terminal is estimated by the following expressions:

$Te(i)=DRC(i)/k$ $TIR(i)=(Te(i)-T(i))/T(i)$ where i is an identification number of an access terminal, k is the number of access terminals connected in the second base transceiver subsystem, DRC(i) is the data rate information of access terminal AT(i), Te(i) is an estimated throughput, T(i) is the current average throughput, and TIR(i) is an estimated throughput ratio.

10. A base transceiver subsystem according to claim 9, wherein, if a plurality of access terminals request handoff, one access terminal is handed off in accordance with the estimated throughput ratio, and then it is repeatedly judged whether to hand off the other access terminals requesting handoff in accordance with a throughput ratio estimated in the radio environment at the handoff destination with the access terminal added by handoff being taken into account.

11. A base transceiver subsystem according to claim 9, wherein the throughput is estimated further in accordance with an availability in the service area.

12. A base transceiver subsystem according to claim 9, wherein the base station controller or the base transceiver subsystem of the second base transceiver subsystem to which handoff is requested sends a data with a lock bit set to UNLock to the access terminal if a decrease in throughput is estimated after the handoff;
the access terminal receives the data with the lock bit set to UNLock, and sends a data rate control signal selecting the base transceiver subsystem of the first base transceiver subsystem to the base transceiver subsystems of the first base transceiver subsystem and the second base transceiver subsystem although C/I of the base transceiver subsystem of the second base transceiver subsystem to which handoff is requested is higher than C/I of the base transceiver subsystem of the first base transceiver subsystem where communication is in progress;
the base station controller or the base transceiver subsystem of the first base transceiver subsystem sends a data with the lock bit set to Lock to the access terminal; and
the base station controller or the base transceiver subsystem of the second base transceiver subsystem sends a data with the lock bit set to UNLock to the access terminal.

* * * * *